Aug. 30, 1955    G. USTIN    2,716,741
STRAIN RELIEF DEVICE
Filed June 29, 1951
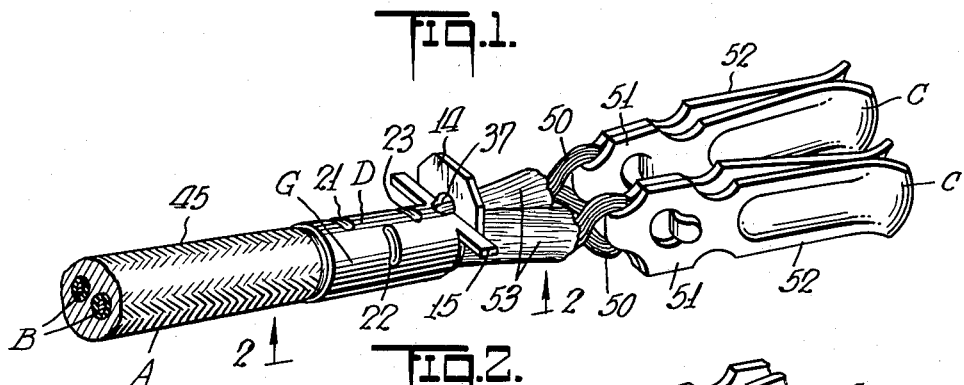
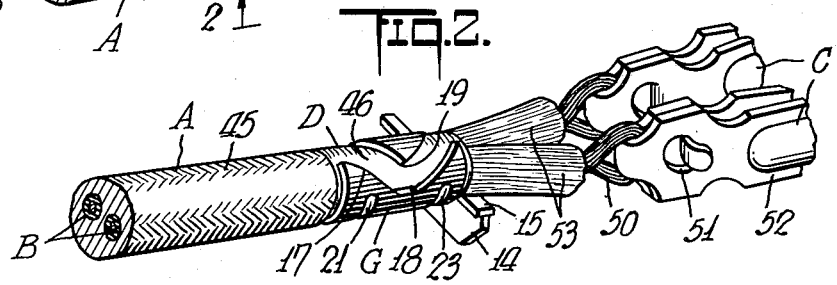
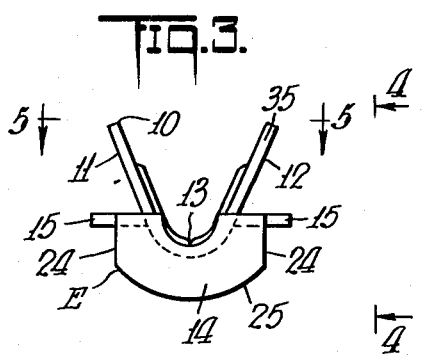
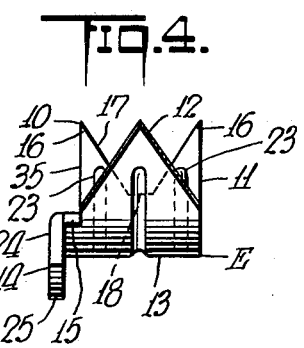
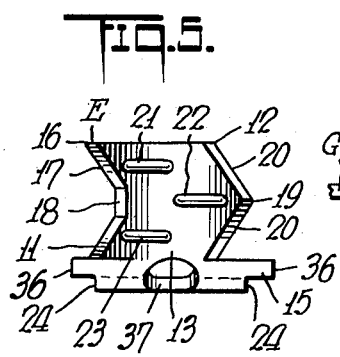
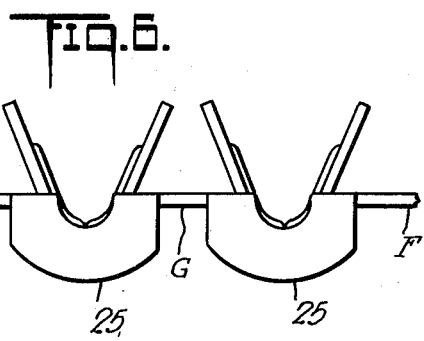
INVENTOR
George Ustin
BY
ATTORNEY

United States Patent Office 2,716,741
Patented Aug. 30, 1955

2,716,741

STRAIN RELIEF DEVICE

George Ustin, Palisades Park, N. J., assignor to Continental Copper & Steel Industries, Inc., New York, N. Y., a corporation of Delaware Application June 29, 1951, Serial No. 234,318

3 Claims. (Cl. 339—103)

The present invention relates to a device for relieving the strain to be associated with electrical connections, and it particularly relates to a strain relief clip to be associated with electrical cords and conduits to relieve stress and strain adjacent the outlet connections.

It is among the objects of the present invention to provide a simple, readily manufactured, reliable, readily attached strain relief device to be applied to electrical cables or connections, and particularly to electrical cords adjacent to plugs or similar connection devices which will relieve twisting and pulling strains adjacent the points of connection to the plugs or end connections, and which will also assure greatly reduced tendency towards rupturing, twisting, breakage or distortion upon the normal wear and tear incidental to usage.

Another object is to provide a simple, compact, readily applied sheet metal strain relief device for electrical cords or connections which will permit ready and simple manufacture from sheet metal and which, at the same time, will permit ready separation and application of the strain relief devices to electrical cords, cables or connections as the case may be.

A further object is to provide a simple, compact strain relief connection which may be readily applied to electrical cords, particularly for household use, and which will assure that said cords adjacent the plugs will be relieved of undue pulling, twisting or jerking strains likely to rupture the wires or cause malfunction of the plug or electrical connections associated therewith.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to form the strain relief device from one continuous strip or bar of thin sheet metal, preferably steel which may be of preplated stock, treated or plated so as to resist corrosion.

Although the size of the stock may vary considerably, it has been found most satisfactory according to one embodiment of the present invention to use a stock of between say 18 to 24 gauge and preferably of 21 gauge with a total range from .025 to .040 and preferably averaging about .0329.

In the preferred form, the said metal strip is turned up in a series of V's at spaced intervals with the end of one leg of the V having a point which is designed to fit into a specially prepared V recess at the end of the other leg of the V.

The bases and sides of the V are preferably provided with spaced grooves or recesses which desirably extend around the base of the V and directly up along the sides of the V.

On the edge of the strip opposite the V the metal is preferably turned downwardly to form a cuff with outstanding prongs, the prongs desirably constituting the connections between the effective V's in the continuous strip of metal.

In application each element may be cut off of the continuous strip and the sides of the V then wrapped around the cable cord or conductor adjacent the connections, or attachment to the blades, receptors or other elements which may be embodied in a plug arrangement. At the same time, the cuff and prongs are permitted to stand outwardly from the sides of the cord, cable or conductor, as the case may be.

The close fitting sleeve thus formed, together with the outstanding prongs and collar will protect the cord against torque and aid in resisting the rupturing effect of pulling and twisting movements applied to the cord, as frequently happens when the plug is removed by pulling upon the cord rather than upon the plug itself.

The strain relief device of the present invention will assure greater added life to the plug and electrical connections thereat, and will also give additional assurance against short circuiting or breaking of the connections between the cord and its end terminals.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side perspective view from above showing the application of the strain relief device of the present application to an electrical cord adjacent its end connections.

Fig. 2 is a bottom perspective view from the other side of Fig. 1 taken from the approximate direction of 2—2 of Fig. 1.

Fig. 3 is an end elevational view of a separated strain relief device before application to the electrical cords of Figs. 1 and 2.

Fig. 4 is a side elevational view taken from the line 4—4 of Fig. 3.

Fig. 5 is a top plan view taken from the line 5—5 of Fig. 3.

Fig. 6 is a side elevational view showing the manner of forming the strain relief devices of Figs. 3, 4 and 5 in a continuous series.

Referring to Figs. 1 and 2 there is shown a typical electrical cord or conduit A having wire connectors B embodied therein, and terminating in the elements C which are designed for connection with the prongs of an electrical appliance or the like.

The present invention is particularly directed to the strain relief device indicated at D in Figs. 1 and 2 in its final condition and at E in Figs. 3, 4 and 5 in its pre-application condition.

In Fig. 6 there is shown a continuous strip of elements E of Figs. 3, 4 and 5 as they may be formed out of a strip of sheet metal by successive die and forming operations.

Referring first to Figs. 3, 4 and 5, the strain relief device has a V-shaped body 10 with the legs 11 and 12 and a base 13. At the end of the base 13 is provided a downwardly extending cuff 14 with the side horizontal prongs 15 which may form a means of connection to adjacent elements when formed as a continuous strip as indicated at G in Fig. 6.

The leg 11 of the V body 10 may have two sharp points 16, one at the side of the V recess 17 which extends downwardly to the position 18 where the base of the V recess is flattened.

The other leg 12 may have a V projection 19 with the sharp sides 20 which fit or are designed to cooperate with the sides of the V recess 17. The sides of the V are provided with the ridges or grooves preferably forcing the metal inwardly at 21, 22 and 23 to give added strength to the V stock 10 and also give enhanced strength when the device of Figs. 3, 4 and 5 is folded around the ends of the cord A.

The downward extending cuff 14 desirably has the vertical sides 24 and the rounded base edge 25, and desirably the cuff, as indicated in Fig. 4, is slightly offset from the face 35 of the V member 10. At the junction of the cuff 14 and the V stock 10 is positioned the outwardly extending prongs 15 which extend at 36 substantially beyond the vertical side edges 24 of the cuff 14. Desirably at the junction of the base 13 of the V and the cuff 14 is positioned the opening 37.

In applying the device of Figs. 3, 4 and 5 to the cords A as indicated in Figs. 1 and 2, the V is wrapped around the end of the cord as indicated by the cylinder G in Figs. 1 and 2. The ridges 21, 22 and 23 will bite into the outer portion 45 of the cord. At the same time, the point or tip 19 will extend toward the edge 17 of the recess at the end of the leg 11 of the V member 10. This will leave the recess as indicated at 46, at which excess material in the outer layer 45 of the cord A may bulge. The opening 37 will act to relieve stress upon folding and rounding into the shape G.

The cuff 14 and the prongs 15 will relieve torque and twisting strains whereas the entire stock of the legs 11 and 12 will also relieve pulling strains and jerking directed transversely or obliquely of the cord A.

The strain relief device D, as shown in Figs. 1 and 2, when imbedded in a plug or other plastic carrier will eliminate any undue strain upon the wire connections, as indicated at 50, and particularly at the point where they are connected to the ends 51 of the receiver elements 52. The sleeves 53 may also be made of thinner stock and will not tend to be ruptured or torn by twisting or jerking of the cord A.

Although the dimensions may widely vary, it has been found most satisfactory to form the strain relief device of 21 gauge metal with a total depth of about .4 to .6" and a width of about 9/16".

As many changes could be made in the above strain relief device, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A strain relief device having a cylindrical wrap-around portion and an outwardly extending right angle cross section member at one end of said wrap-around portion of a continuous strip of metal, each said device consisting of a V-shaped member with a rounded base and divergent legs with one leg end having a triangular central recess and the other leg end having a sharp triangular point conforming to said recess, said legs engaging a cable with a substantial space between the ends of the legs, a flat cuff at one edge only and at the base of said V-shaped member extending transversely away from the rounded base of the V and laterally beyond the side legs of the V.

2. The device of claim 1, the junction between the cuff and the rounded base being provided with a relatively wide circular opening for relief of stress, said opening extending substantially down the junction side of the cuff and also substantially across the adjacent portion of the rounded base.

3. The device of claim 1, said cuff and rounded base adjacent the junction therebetween being provided with outwardly extending horizontal prongs which are between the cuff and the base, said prongs being in a plane transverse to the plane of the cuff.

References Cited in the file of this patent

UNITED STATES PATENTS

| | | |
|---|---|---|
| 962,921 | Schneider | June 28, 1910 |
| 1,239,531 | Smart | Sept. 11, 1917 |
| 1,262,155 | Zimmerman | Apr. 9, 1918 |
| 1,631,719 | Chandler | June 7, 1927 |
| 1,713,526 | Frederickson | May 21, 1929 |
| 1,752,585 | Beardsley et al. | Apr. 1, 1930 |
| 2,116,269 | Kobzy | May 3, 1938 |
| 2,290,787 | Walker | July 21, 1942 |
| 2,367,996 | Clark et al. | Jan. 23, 1945 |
| 2,406,079 | Krueger | Aug. 20, 1946 |
| 2,412,804 | Early | Dec. 17, 1946 |
| 2,466,607 | Matthysse | Apr. 5, 1949 |
| 2,480,895 | Anderson | Sept. 6, 1949 |
| 2,645,760 | Fortino | July 14, 1953 |